Jan. 1, 1952     C. E. JOHNSON ET AL     2,580,926
TIRE REMOVING APPARATUS WITH CIRCUMFERENTIALLY
DISTRIBUTED BEAD ENGAGING MEMBERS
Filed Dec. 29, 1949     2 SHEETS—SHEET 1

Gustave C. Bratland
Charley E. Johnson
           INVENTORS

BY *Clarence A. O'Brien
and Harvey B. Jacobson*
                Attorneys

Gustave C. Bratland
Charley E. Johnson
INVENTORS

UNITED STATES PATENT OFFICE 2,580,926

TIRE REMOVING APPARATUS WITH CIRCUMFERENTIALLY DISTRIBUTED BEAD ENGAGING MEMBERS

Charley E. Johnson and Gustave C. Bratland, Yamhill, Oreg.

Application December 29, 1949, Serial No. 135,597

1 Claim. (Cl. 157—1.2)

The present invention relates to new and useful improvements in tire removing apparatus designed particularly for use in removing heavy truck tires from the rims on which they are mounted.

An important object of the invention is to provide an apparatus for lifting the rim from the tire casing while the casing is held against movement and to further provide means for breaking the beading of the tire away from the rim.

A further object of the invention is to provide a tire removing apparatus which rests on the side of a tire casing, after the latter has been removed from a vehicle and providing a jack supported on the apparatus with means connecting the jack to the wheel rim for exerting an upward pulling force on the rim while subjecting the tire casing to pressure opposed to the upward pulling force.

A still further object is to provide an apparatus of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
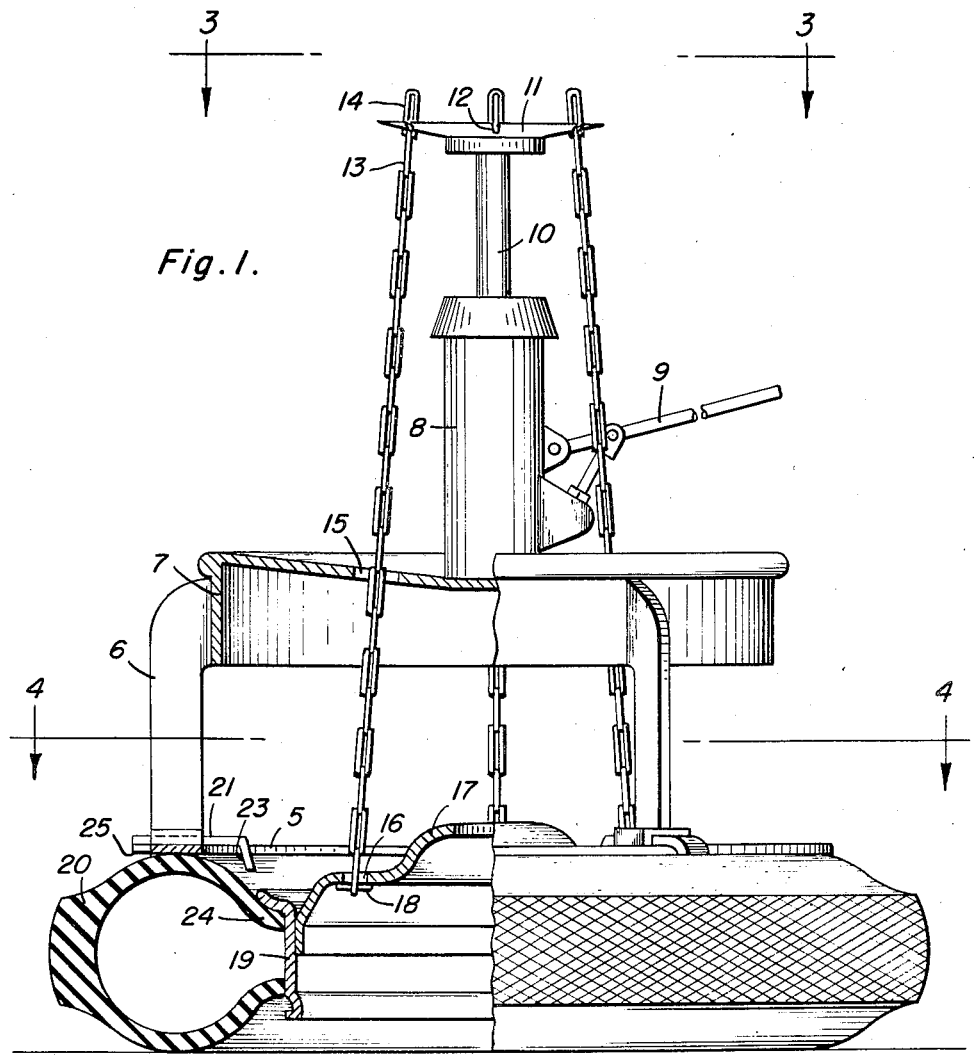
Figure 1 is a side elevational with parts broken away and shown in section.

Referring now to the drawings in detail, wherein for the purpose of illustration, we have disclosed a preferred embodiment of the invention, the numeral 5 designates a base ring from which posts or legs 6 extend upwardly and on the upper ends of which a jack supporting platform 7 is suitably secured.

A jack 8 of a conventional type is supported in an upright position or platform 7 and is provided with an operating handle 9 for raising and lowering a stem or plunger 10.

A disk 11 is suitably secured to the upper end of stem or plunger 10 and is formed with notches 12 in its periphery for receiving one of the links of a chain 13 to position an adjacent upper link 14 crosswise of the notch to connect the chain for movement with the disk.

A plurality of the chains 13 are thus connected to disk 11 and extend downwardly through openings 15 in platform 7 and downwardly through the lug attaching opening 16 of a wheel 17 for positioning a bar or pin 18 at the lower end of the chain crosswise of opening 16 to thus attach the chains to the wheel. The wheel 17 includes the usual rim 19 on which the tire casing 20 is mounted.

A plurality of dogs 21 are slidably adjusted radially in guides 22 at the lower ends of posts 6, each dog including a downwardly inclined inner end 23 for engaging the tire casing 20 in the region of the beading 24 thereof. The outer end of the dog 21 is provided with a stop 25 to prevent loss of the dog from the guide 22.

In the operation of the device, the wheel 17 with the tire casing 20 thereon is removed from the vehicle and laid upon its side and base ring 5 is then placed on the uppermost side of the tire casing as shown in Figure 1 of the drawings.

Chains 13 are then connected at their lower ends with the wheel 17 by placing the bars or pins 18 crosswise in the openings 16 of the wheel and with the upper ends of the chains attached to disk 11 at the top of jack 8.

Figure 2:
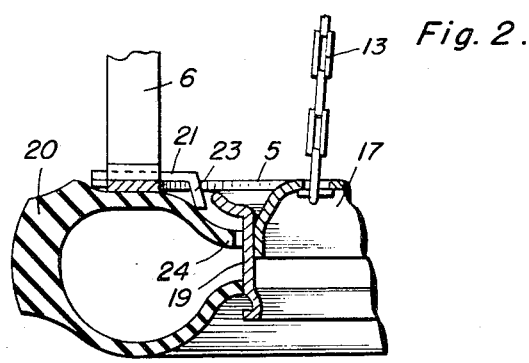
Figure 2 is a fragmentary sectional view of a tire casing and rim showing one of the dogs for freeing the beading from the rim.
Figure 3:
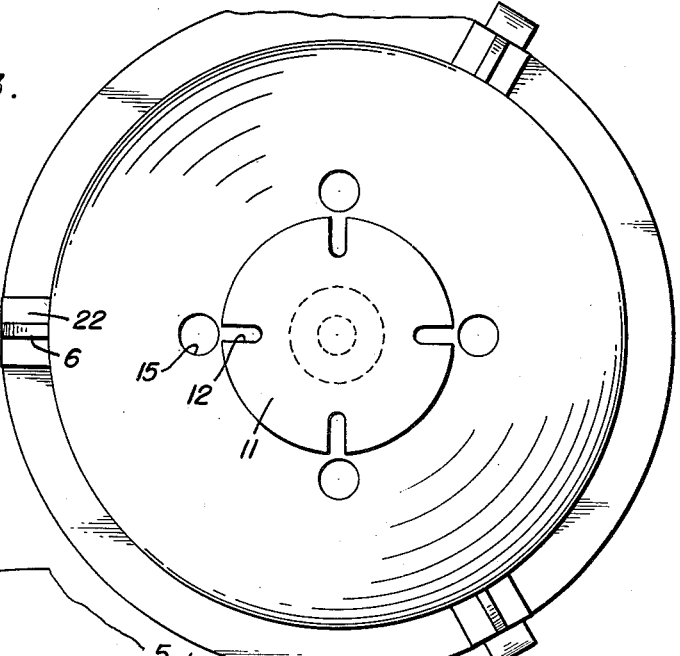
Figure 3 is a top plan view.
Figure 5:
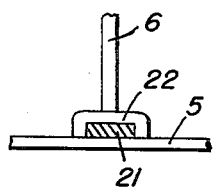
Figure 5 is a fragmentary sectional view taken on a line 5—5 of Figure 4 and showing one of the beading separating dogs.
Figure 4:
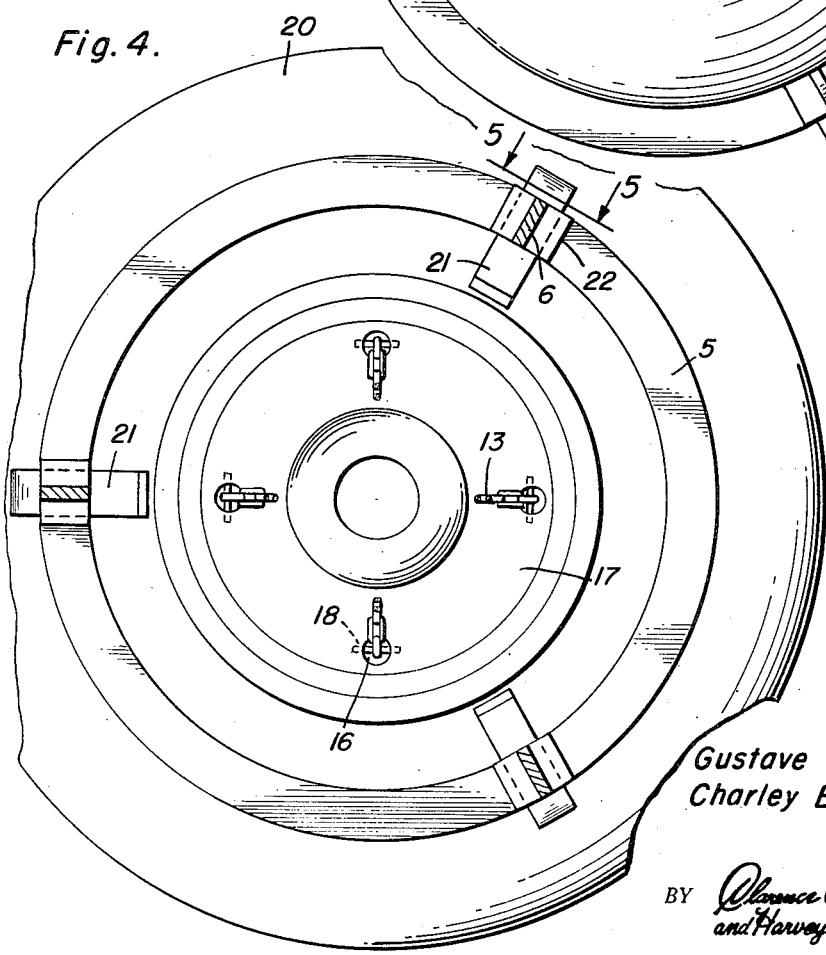
Figure 4 is a transverse sectional view taken on a line 4—4 of Figure 1.

The jack is then operated to raise stem or plunger 10 and disk 11 thereby pulling the wheel 17 and rim 19 upwardly while the tire casing 20 is held stationary by base ring 5 resting thereon. The downward pressure subjected to the tire casing will partially collapse the same into the position shown in Figure 2 of the drawings and move the downwardly inclined inner end 23 of dogs 21 into engagement with the beading of the tire to thus break the beading free from the rim and as the upward lifting force on wheel 17 continues the rim will be lifted from the tire casing.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An apparatus for removing a tire from a rim on which the same is mounted, said apparatus comprising a base ring adapted to rest on a tire side wall outwardly of the rim, a plurality of upstanding legs secured at circumferentially spaced points to said ring, a circular platform having a depending marginal flange secured to upper ends of said legs and including a concave upper surface affording a seat at the center thereof, a mechanical lifting device having a base portion positioned on said seat and including a vertically projectable lifting member, a disc positioned at the upper end of said lifting member and provided in its marginal edge portion with notches, a set of chains adjustably anchored in said notches and extending downwardly through apertures in said platform for connection to the stated rim, lower end portions of said legs being provided with radial slots, and a plurality of radially adjustable dogs slidable in said slots, said dogs having downturned inner end portions adapted to engage a tire bead.

CHARLEY E. JOHNSON.
GUSTAVE C. BRATLAND.

REFERENCES CITED

The following references are of record in the file of this patent:

UNITED STATES PATENTS

| Number | Name | Date |
|---|---|---|
| 1,890,746 | O'Dell | Dec. 13, 1932 |
| 2,010,713 | Countryman | Aug. 6, 1935 |
| 2,034,819 | Maulis | Mar. 24, 1936 |
| 2,148,111 | Dennis | Feb. 21, 1939 |
| 2,406,996 | Colley | Sept. 3, 1946 |
| 2,449,289 | Garey | Sept. 14, 1948 |

OTHER REFERENCES

Aviation Magazine, page 157, April 1945.